Sept. 28, 1943.　　　　B. Q. JONES　　　　2,330,218
ARMORED VEHICLE BODY
Filed March 28, 1940　　　2 Sheets-Sheet 1
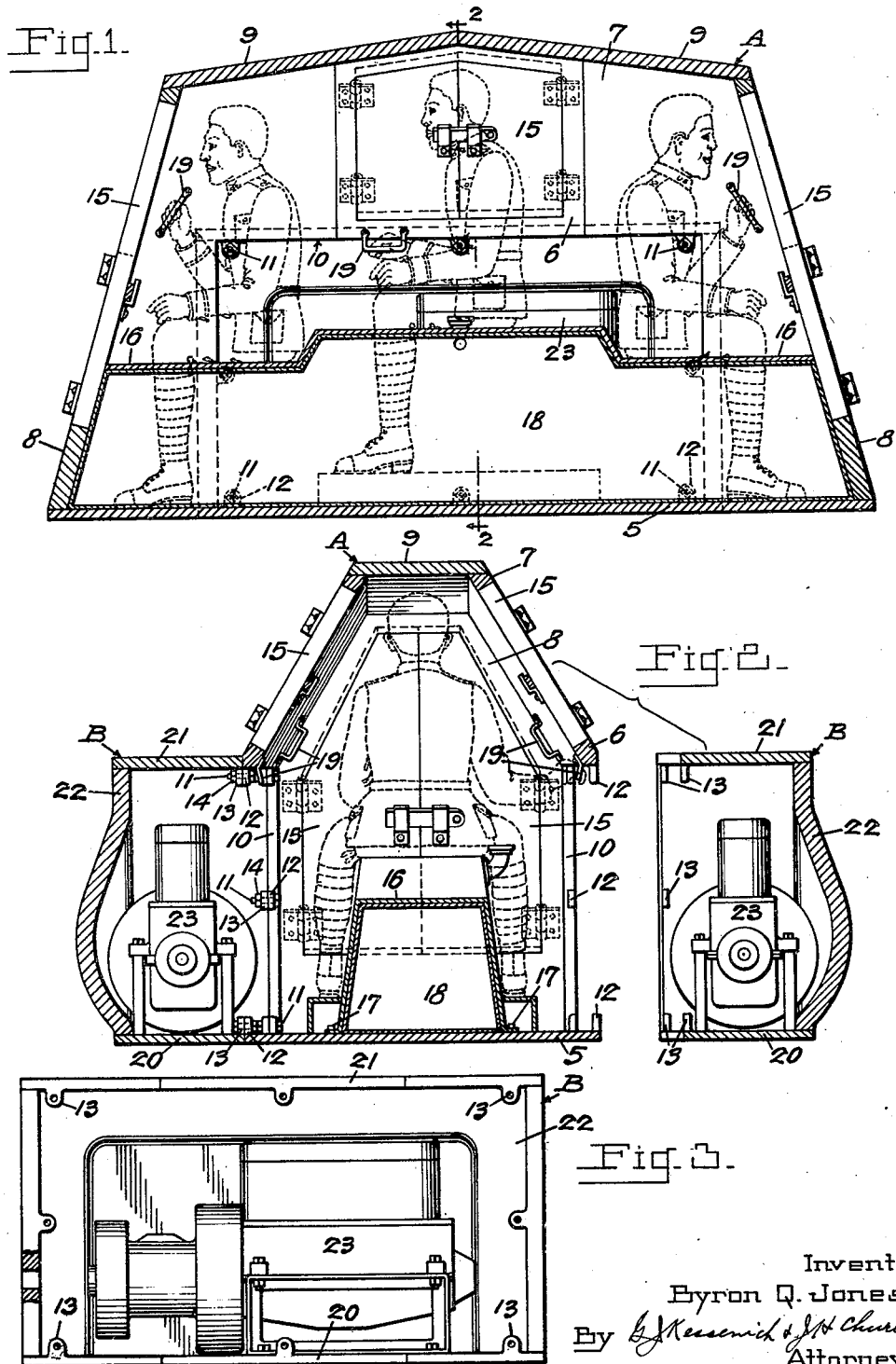
Inventor
Byron Q. Jones
By Kessenich & Church
Attorneys

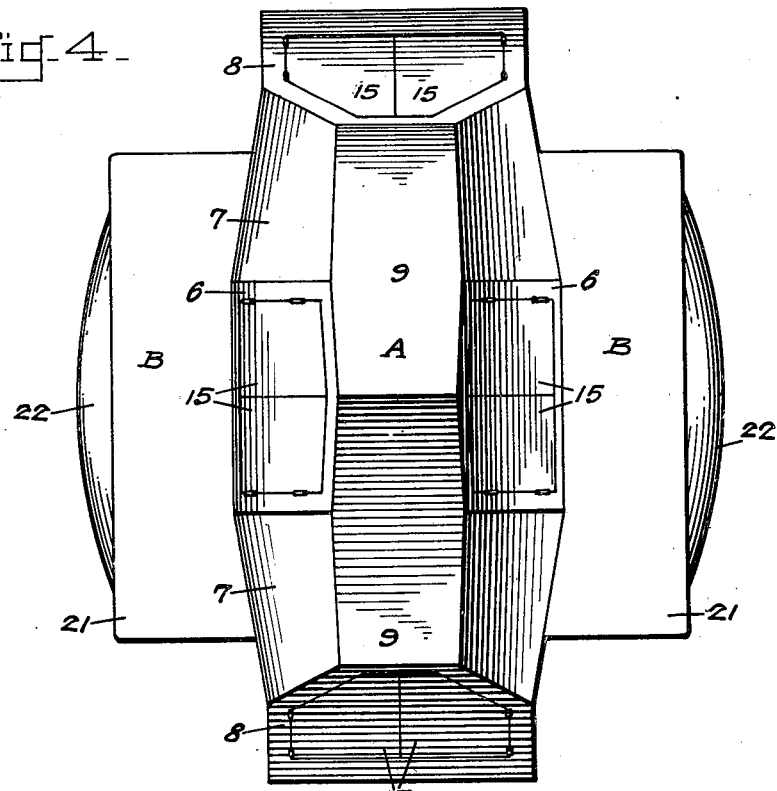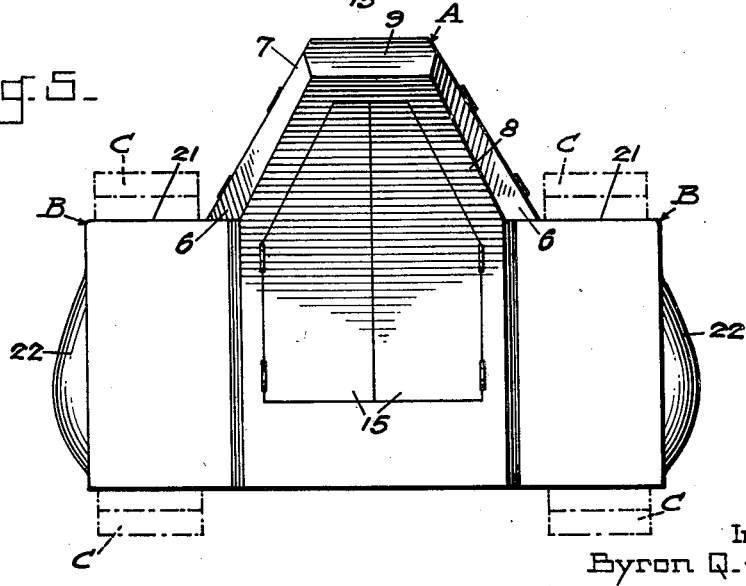

Patented Sept. 28, 1943

2,330,218

UNITED STATES PATENT OFFICE 2,330,218

ARMORED VEHICLE BODY

Byron Q. Jones, United States Army, Fort Knox, Ky.

Application March 28, 1940, Serial No. 326,421

2 Claims. (Cl. 180—9.1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an armored vehicle especially adapted for military purposes.

With the development of effective anti-tank guns and armor-piercing projectiles the race between armor and projectile has resulted in the creation of ponderous vehicles whose tactical mobility and military efficiency have been seriously impaired. A study of the employment of tanks in warfare with a consideration of the defenses evolved to combat them reveals the possibilities and importance of a small, high speed tank presenting reduced visibility and vulnerability and capable of carrying a sufficient crew to develop great offensive power.

The provision of a tank of restricted weight which will meet these requirements involves a departure from conventional design and arrangement and a careful analysis of space considerations. The vehicle of this invention is characterized by a novel arrangement of engine and crew compartments in which a pair of side units, each housing an engine, are detachably connected to a center unit in which the occupants seated in tandem, straddle a longitudinal disposed fuel tank of large capacity. The occupants are not only favorably positioned for easy entry and departure in the face of opposition or when the tank is overturned but they are each in a position from which they may, without interference, control the tank and operate weapons.

A further object of the invention is to provide a tank which will be capable of rapid quantity production and which will be amphibious.

The specific nature of the invention as well as other objects and advantages thereof will clearly appear from a description of a preferred embodiment as shown in the acompanying drawings in which:

Fig. 1 is a longitudinal sectional view of the improved vehicle body;

Fig. 2 is a sectional view on the line 2—2 of Fig. 1;

Fig. 3 is a view in side elevation of one of the side units;

Fig. 4 is a plan view, and

Fig. 5 is a view in end elevation.

Referring to the drawings by characters of reference there is shown a vehicle body comprising a center unit A and similar side units B—B. The center unit consists of a floor 5, sides 6 with a sloping and stream-lined superstructure 7, sloping ends 8—8 and a sloping roof 9. The sides are each formed with a large opening indicated at 10 which is closed when the corresponding side unit B is attached to the center unit, the connection being effected in a simple manner by means of a bolt 11 passing through lugs 12 and 13 on the units and receiving a nut 14.

The sides 6 and ends 8 are each provided with a door 15 so that the crew may have an entry and an exit at four points, which is of advantage when the vehicle catches fire or turns over or when the crew are obliged to escape from the vehicle while under hostile fire. All of the doors are positioned for convenient access to the entire crew and for the easy removal of casualties among the crew.

A long narrow casing 16 extends longitudinally the full length of the center unit and is secured to the floor, conveniently by bolts 17. The casing encloses one or more fuel tanks 18 and provides an extremely large capacity while the location insures maximum protection from gun fire. The casing 16 has a width and height to provide a seat which may be comfortably straddled by the crew who sit in tandem and may face to the front or rear, the center occupant being preferably slightly elevated. This type of seat in conjunction with conveniently placed handholds 19 enables the occupant to maintain his position even when passing over rough ground. As shown in Fig. 2 the center unit provides sufficient space for the occupants and conforms generally to the outline of an occupant in seated position. There is sufficient space laterally between the occupants and the side units B to provide for the installation of control equipment (not shown) whereby any one of the occupants may operate the vehicle.

Each side unit B includes a floor 20 which is continuous with the floor 5 of the center unit, and a roof 21 which meets the sloping superstructure 7 approximately midway the height of the center unit. The side wall 22 of each unit B is preferably of thicker armor plate to afford protection against penetration of projectiles to the interior of the vehicle body.

Each side unit B contains an engine or power plant 23 which is used to drive wheels or an endless track indicated generally at C, and disposed above and below the side unit. This arrangement not only restricts the height of the body to the relatively narrow center unit but it also provides a favorable low center of gravity.

The detachable character of the side units facilitates repair of the power plants and provides for quick and easy substitution so that the vehicle need be out of commission for but a brief period.

I claim:

1. An armored vehicle adapted to house one or more occupants, vehicle propulsion mechanism, and fuel therefor, in combination, a center unit, a hollow member extending centrally and longitudinally along the said center unit for containing the said fuel and for seating the said occupants in tandem, the sides of the said member being spaced from the sides of the said center unit to provide clearance for the legs of the occupants seated astraddle the said member and the top of the said member being spaced from the roof of the said center unit to provide a minimum of clearance for the bodies of the said occupants, the sides of the center unit sloping downward from its said roof to provide the minimum of clearance on both sides of the upper body portion of the occupants and to present sloped outside surfaces, the sides of the said center unit below its said sloped portion being provided with an opening, and a pair of side units detachably secured to the sides of the center unit to close its said openings and adapted to house the said propulsion mechanism, the top of the said side units meeting the said sloped portion of the sides of the center unit approximately midway the height of said center unit.

2. An armored vehicle adapted to house one or more occupants, vehicle propulsion mechanism, and fuel therefor, in combination, a center unit, a hollow member extending centrally and longitudinally along the said center unit for containing the said fuel and for seating the said occupants in tandem, the sides of the said member being spaced from the sides of the said center unit to provide clearance for the legs of the occupants seated astraddle the said member and the top of the said member being spaced from the roof of the said center unit to provide a minimum of clearance for the bodies of said occupants, the sides of the center unit sloping downward from its said roof to provide the minimum of clearance on both sides of the upper body portion of the occupants and to present sloped outside surfaces, the sides of the said center unit below its said sloped portion being provided with an opening, and a pair of side units detachably secured to the sides of the center unit to close its said openings and adapted to house the said propulsion mechanism.

BYRON Q. JONES.